US012675995B2

(12) United States Patent
Chou et al.

(10) Patent No.: US 12,675,995 B2
(45) Date of Patent: Jul. 7, 2026

(54) MULTIMEDIA IMAGE PROCESSING METHOD, ELECTRONIC DEVICE, TERMINAL DEVICE CONNECTED THERETO, AND NON-TRANSITORY COMPUTER-READABLE RECORDING MEDIUM

(71) Applicant: COMPAL ELECTRONICS, INC., Taipei (TW)

(72) Inventors: Pin-Yu Chou, Taipei (TW); Yueh-Hua Lee, Taipei (TW); Ming-Hsien Wu, Taipei (TW); Hui-Mei Hung, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 296 days.

(21) Appl. No.: 18/519,102

(22) Filed: Nov. 27, 2023

(65) Prior Publication Data

US 2024/0177482 A1 May 30, 2024

Related U.S. Application Data

(60) Provisional application No. 63/428,114, filed on Nov. 28, 2022.

(51) Int. Cl.
| | |
|---|---|
| *G06T 7/70* | (2017.01) |
| *G06V 10/77* | (2022.01) |
| *G06V 20/40* | (2022.01) |
| *G06V 40/16* | (2022.01) |
| *G06V 40/20* | (2022.01) |

(52) U.S. Cl.
CPC ................ *G06V 20/41* (2022.01); *G06T 7/70* (2017.01); *G06V 10/77* (2022.01); *G06V 40/174* (2022.01); *G06V 40/20* (2022.01); *G06T 2207/10016* (2013.01); *G06T 2207/20084* (2013.01); *G06T 2207/30201* (2013.01)

(58) Field of Classification Search
CPC ...... G06V 20/41; G06V 40/174; G06V 10/77; G06V 40/20; G06T 7/70; G06T 2207/10016; G06T 2207/20084; G06T 2207/30201
See application file for complete search history.

(56) References Cited

U.S. PATENT DOCUMENTS

| | | | |
|---|---|---|---|
| 10,915,798 B1 * | 2/2021 | Zhang | ..................... G06V 20/00 |
| 2014/0328570 A1 * | 11/2014 | Cheng | ..................... G06F 16/43 386/241 |
| 2018/0150698 A1 * | 5/2018 | Guttmann | .............. G06V 20/41 |

(Continued)

*Primary Examiner* — Syed Haider

(57) ABSTRACT

A method for multimedia image processing includes steps of identifying objects and selecting images, and is characterized in that when a body position of a preset object is detected and conformed to match a preset posture; or a plurality of the preset objects are detected to have body movements and facial expressions that are emotional, and the preset objects have at least one of looking in similar directions, one looking at the other, and at least two looking at each other, an interception time point is selected for selecting a candidate image, and the candidate image can be collected to produce a concatenated video with rich contents. An electronic device is also introduced for multimedia image processing, a terminal device connected thereto, and a non-transitory computer-readable recording medium.

20 Claims, 15 Drawing Sheets

(56)     References Cited

U.S. PATENT DOCUMENTS

| | | | |
|---|---|---|---|
| 2019/0130580 A1* | 5/2019 | Chen | G06V 10/82 |
| 2022/0012568 A1* | 1/2022 | Pardeshi | G06N 3/094 |
| 2022/0284220 A1* | 9/2022 | Wu | G06N 3/088 |
| 2023/0140505 A1* | 5/2023 | Amato | G06F 18/21 |
| | | | 382/103 |

* cited by examiner

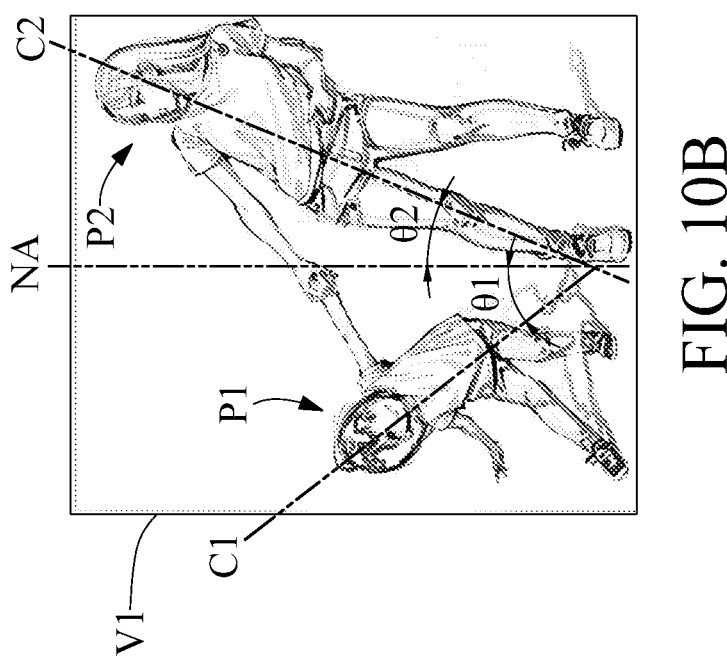
FIG. 10A
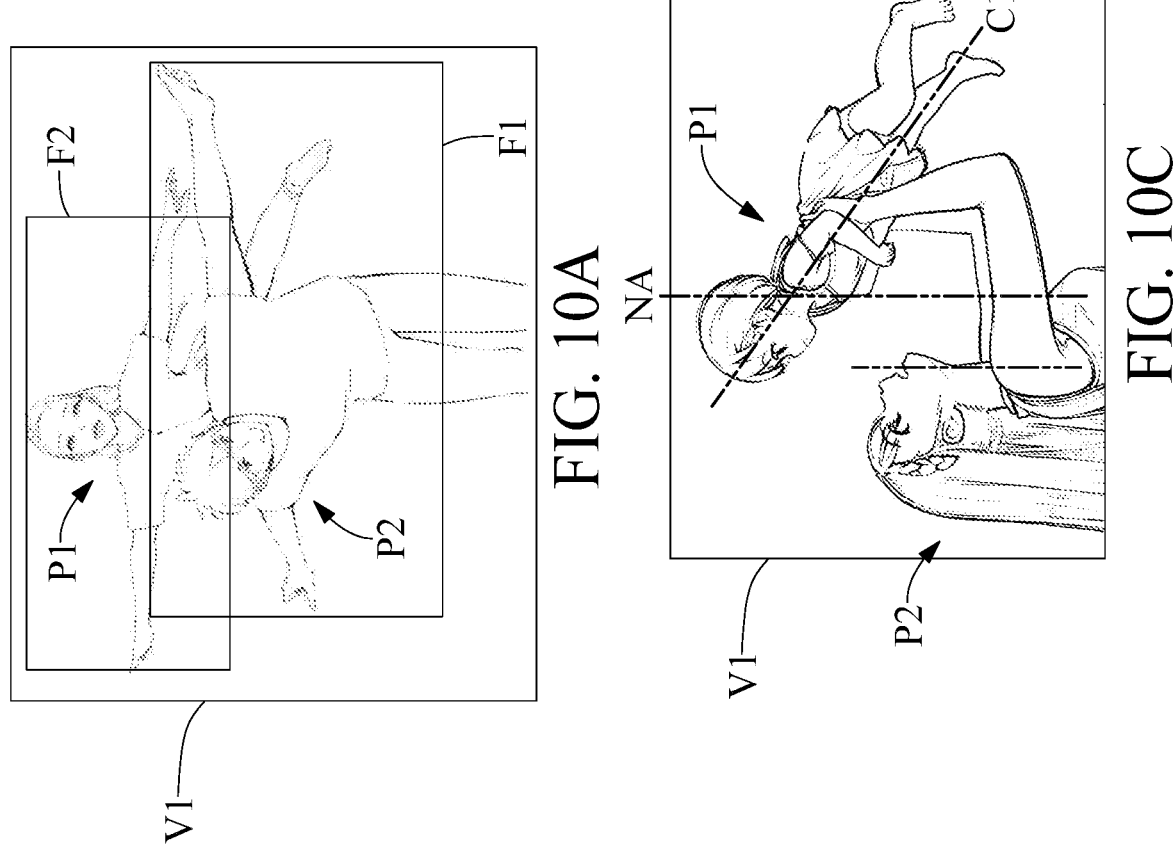
FIG. 10B
FIG. 10C

MULTIMEDIA IMAGE PROCESSING METHOD, ELECTRONIC DEVICE, TERMINAL DEVICE CONNECTED THERETO, AND NON-TRANSITORY COMPUTER-READABLE RECORDING MEDIUM

CROSS-REFERENCE TO RELATED APPLICATION

This non-provisional application claims priority under 35 U.S.C. § 119(e) on U.S. provisional Patent Application No. 63/428,114 filed on Nov. 28, 2022, the entire contents of which are hereby incorporated by reference.

BACKGROUND OF THE INVENTION

1. Field of the Invention

The present disclosure provides a multimedia image processing technology, and in particular a multimedia image processing method, an electronic device, a terminal device connected thereto, and a non-transitory computer-readable recording medium.

2. Description of the Related Art

As to the known monitoring system of children, although the images captured by the photographic device can be selected by artificial intelligence, the mode of selection is mainly judged by whether the characters in the image have a preferable composition, and fails to judge whether the characters present special expressions or movements, such as exaggerated body positions or body postures different from the general situation; it is also not judged whether there is a movement interaction and/or expression association between the characters, for example, whether there are similar expressions or movements between multiple characters in the image to resonate, and expressions or movements are obviously different to cause contrast, whether there is eye contact between the characters, or whether there is a body overlapping between the characters, and other vivid images, resulting in the fact that the selected image content is generally not rich enough.

Therefore, it is the main focus of the present disclosure on how to solve the problem of the above monitoring system.

BRIEF SUMMARY OF THE INVENTION

The inventor developed a multimedia image processing method, an electronic device, a terminal device connected thereto, and a non-transitory computer-readable recording medium, by setting the selection conditions, it is able to select a candidate image that the facial expressions or body movements of preset objects are different from the general situation and/or the preset objects therebetween have interaction to concatenate the images, in order to achieve the selected image content can be richer than the images that are purely selected by artificial intelligence.

In order to achieve the above objective, the present disclosure provides a multimedia image processing method, executed by an electronic device reading an executable code, identifying whether there are a plurality of preset objects by artificial intelligence, and performing multimedia image processing to the plurality of preset objects, including the following steps: identifying preset objects: from an initial image, identifying the plurality of preset objects by artificial intelligence; and selecting images: setting a selection condition, the selection condition includes the plurality of preset objects having body movements and facial expressions that are emotional, and/or the plurality of preset objects have at least one of looking in similar directions, one looking at the other, and at least two looking at each other, when conforming to the selection condition, it is selected as an interception time point in the initial image, and a candidate image is selected according to the interception time point in the initial image, the candidate image can be collected to produce a concatenated video. Furthermore, after the step of selecting images, a step of concatenating videos may be subsequently executed, which selects the candidate image according to the interception time point in the initial image, and collects more than one candidate image to produce the concatenated video.

The present disclosure further provides an electronic device for multimedia image processing, including: a photographic unit for taking an initial image; an intelligent identification unit, electrically connected to the photographic unit to receive the initial image, identifying an initial image having a plurality of preset objects by artificial intelligence, and detecting bodies and facial expressions of the plurality of preset objects in the initial image; and an intelligent processing unit, the intelligent processing unit is electrically connected to the intelligent identification unit, and the intelligent processing unit reads an executable code and executes multimedia image processing to the plurality of preset objects, including setting a selection condition, the selection condition includes the plurality of preset objects have body movements and facial expressions that are emotional, and/or the plurality of preset objects have at least one of looking in similar directions, one looking at the other, and at least two looking at each other, when conforming to the selection condition, it is selected as an interception time point in the initial image, the candidate image can be collected to produce a concatenated video. Furthermore, the intelligent processing unit can select the candidate image according to the interception time point, and collects more than one candidate image to produce the concatenated video.

Accordingly, through the above method and electronic device, it is able to select the candidate image that the body movements of preset objects have interaction and/or the facial expressions are associated, resulting in producing the concatenated video that has narrative and thematic content, so as to meet users' expectations for rich video content.

The present disclosure further provides a multimedia image processing method, executed by an electronic device reading an executable code, identifying whether there is a preset object by artificial intelligence, and performing multimedia image processing to the preset object, including the following steps: identifying preset objects: from an initial image, identifying the preset object by artificial intelligence, detecting a body position of the preset object defining in the initial image; and selecting images: setting a selection condition, the selection condition includes the body position of the preset object conforming to a preset posture, when conforming to the selection condition, it is selected as an interception time point in the initial image, and a candidate image is selected according to the interception time point in the initial image, the candidate image can be collected to produce a concatenated video. Alternatively, the step of concatenating videos is further performed, and the candidate image is selected according to the interception time point in the initial image, and more than one candidate image is collected to produce the concatenated video.

The present disclosure further provides an electronic device for multimedia image processing, including: a photographic unit for taking an initial image; an intelligent identification unit, electrically connected to the photographic unit to receive the initial image, identifying the initial image having a plurality of preset objects by artificial intelligence, and detecting the bodies and facial expressions of the plurality of preset objects; and an intelligent processing unit, electrically connected to the intelligent identification unit, and reading an executable code and executing thereto, in order to set a selection condition, the selection condition includes the body position of the preset object conforming to a preset posture, when conforming to the selection condition, it is selected as an interception time point in the initial image, the intelligent processing unit selects a candidate image according to the interception time point, the candidate image can be collected to produce a concatenated video.

Accordingly, it is able to select a candidate image that the body movements of the preset object are different from the general situation, resulting in producing the concatenated video that has narrative and thematic content, so as to meet users' expectations for rich video content.

The present disclosure also provides a non-transitory computer-readable recording medium of the above method.

In one embodiment, at least one of the preset objects is a child, and at least one is an adult; the selection condition further includes calculating that the facial expression of the child in the initial image is a positive emotion or negative emotion, and the facial expression of the adult in the initial image is a positive emotion.

In one embodiment, the selection condition further includes calculating that the movements of the child and the adult in the initial image are the same or opposite, and/or the expressions are the same or opposite.

In one embodiment, the selection condition includes detecting that there is a selected article in the initial image, and when at least one of the plurality of preset objects is looking at the selected article, and/or at least one is holding the selected article, it is selected as an interception time point in the initial image.

In one embodiment, the plurality of preset objects respectively define a positioning frame in the initial image, each of which is an area occupied by the corresponding preset object in the initial image, the selection condition includes detecting that when an area overlapping the plurality of positioning frames in the initial image is greater than a threshold, it is selected as an interception time point in the initial image.

In one embodiment, a neutral axis is defined in the initial image, and the plurality of preset objects respectively define a human body posture, the selection condition includes determining that when the human body posture of each preset object in the initial image deviates from the neutral axis by a threshold, it is selected as an interception time point in the initial image.

In one embodiment, the plurality of preset objects respectively define a human body midline in the initial image, and the plurality of preset objects respectively define a body position, the selection condition includes determining the body position of each preset object in the initial image, and determining that when the angle of arms opening of each preset object is greater than a threshold, it is selected as an interception time point in the initial image.

In one embodiment, the preset object defines a human body midline in the initial image, the selection condition includes detecting the body position of the preset object in the initial image, and determining that when the body position of the preset object has body stretching, body connection, body constituting geometry, and/or body symmetry, it is selected as an interception time point in the initial image.

The present disclosure further provides a terminal device in communication with the electronic device executing the above method, the terminal device is equipped with an application program, the terminal device executes the application program to play the concatenated video.

In one embodiment, the electronic device is a physical host, a cloud host, or a combination of a physical host and a cloud host.

In one embodiment, the photographic unit and the intelligent identification unit belong to a physical host, and the intelligent processing unit belongs to a cloud host.

In one embodiment, the preset object includes at least one child and one adult, the intelligent identification unit further includes an expression identification module, used to identify the expressions of the child and the adult; a body identification module, used to identify the body positions of the child and the adult; a viewing angle identification module, used to identify the sight direction of the child and the adult; and/or a specific article identification module, used to identify a specific article in the initial image.

The present disclosure further provides a terminal device in communication with the electronic device, the terminal device is equipped with an application program, the terminal device executes the application program to receive a push of the concatenated video from the electronic device.

In one embodiment, the terminal device further includes a cutscene music database and an illustration database, used to provide cutscene music and illustrations when playing the concatenated video.

BRIEF DESCRIPTION OF THE DRAWINGS

FIG. 10A is a schematic view of a scene corresponding to the process B3 of the embodiment of the present disclosure.

FIG. 10B is a schematic view of another scene corresponding to the process B3 of the embodiment of the present disclosure.

FIG. 10C is a schematic view of further another scene corresponding to the process B3 of the embodiment of the present disclosure.

DETAILED DESCRIPTION OF THE INVENTION

To facilitate understanding of the objectives, characteristics and effects of the present disclosure, specific embodiments together with the attached drawings for the detailed description of the present disclosure are provided as below.

Figure 1:
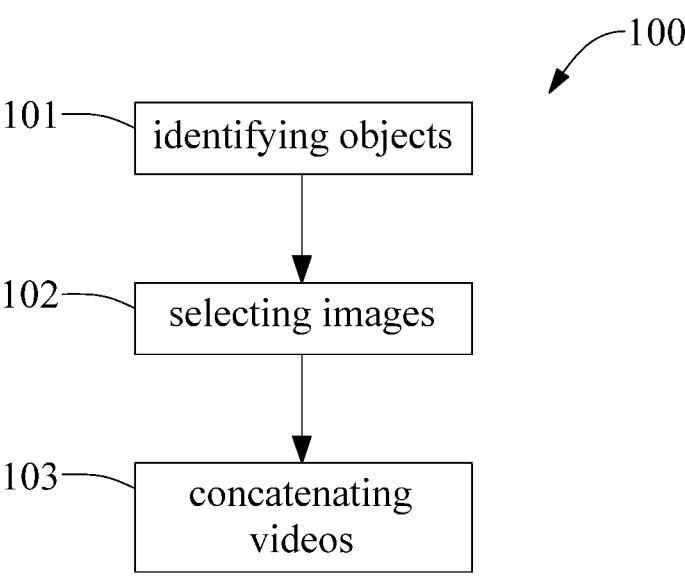
FIG. 1 is a flow chart of main steps of a method of an embodiment of the present disclosure.
Figure 2:
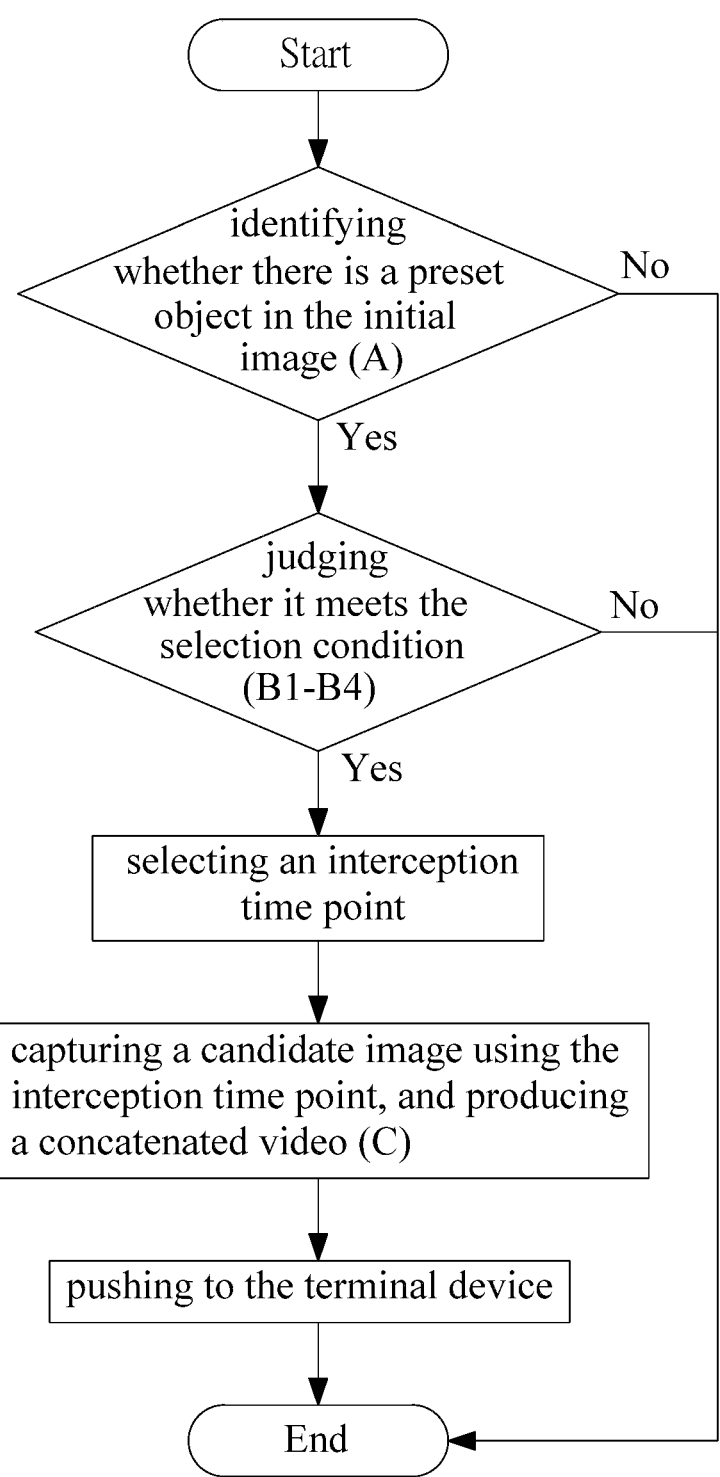
FIG. 2 is a block diagram illustrating the steps of the method of the embodiment of the present disclosure.

Referring to FIGS. 1 to 15, the present disclosure provides a multimedia image processing method 100, an electronic device 200, and a terminal device 300 connected with the electronic device 200, wherein:

The processing method 100 is executed by the electronic device 200 reading an executable code, identifying a preset object by artificial intelligence, and performing multimedia image processing to the preset object, in order to execute steps of identifying objects 101 and selecting images 102 as shown in FIG. 1, and in one embodiment, the method further includes a step of concatenating videos 103. Referring to FIG. 2 together, the step of identifying objects 101 is mainly executed from an initial image V1, identifying whether there is a preset object by artificial intelligence, the preset object includes one or more. The step of selecting images 102 mainly executes the judgment of whether the preset object meets the selection conditions in the initial image V1, such as when a plurality of preset objects conform to have body movements and facial expressions that are emotional, and/or the preset objects have at least one of looking in similar directions, one looking at the other, and at least two looking at each other, an interception time point is selected; alternatively, when the body position of one or more preset objects conforms to a preset posture, an interception time point is selected, and a candidate image V2 is selected according to the interception time point in the initial image V1, and the candidate image V2 can be collected to produce a concatenated video V3. After the step of selecting images, the step of concatenating videos 103 may optionally be executed, which further collects the candidate image V2 selected at the interception time point to produce the concatenated video V3.

Figure 3:
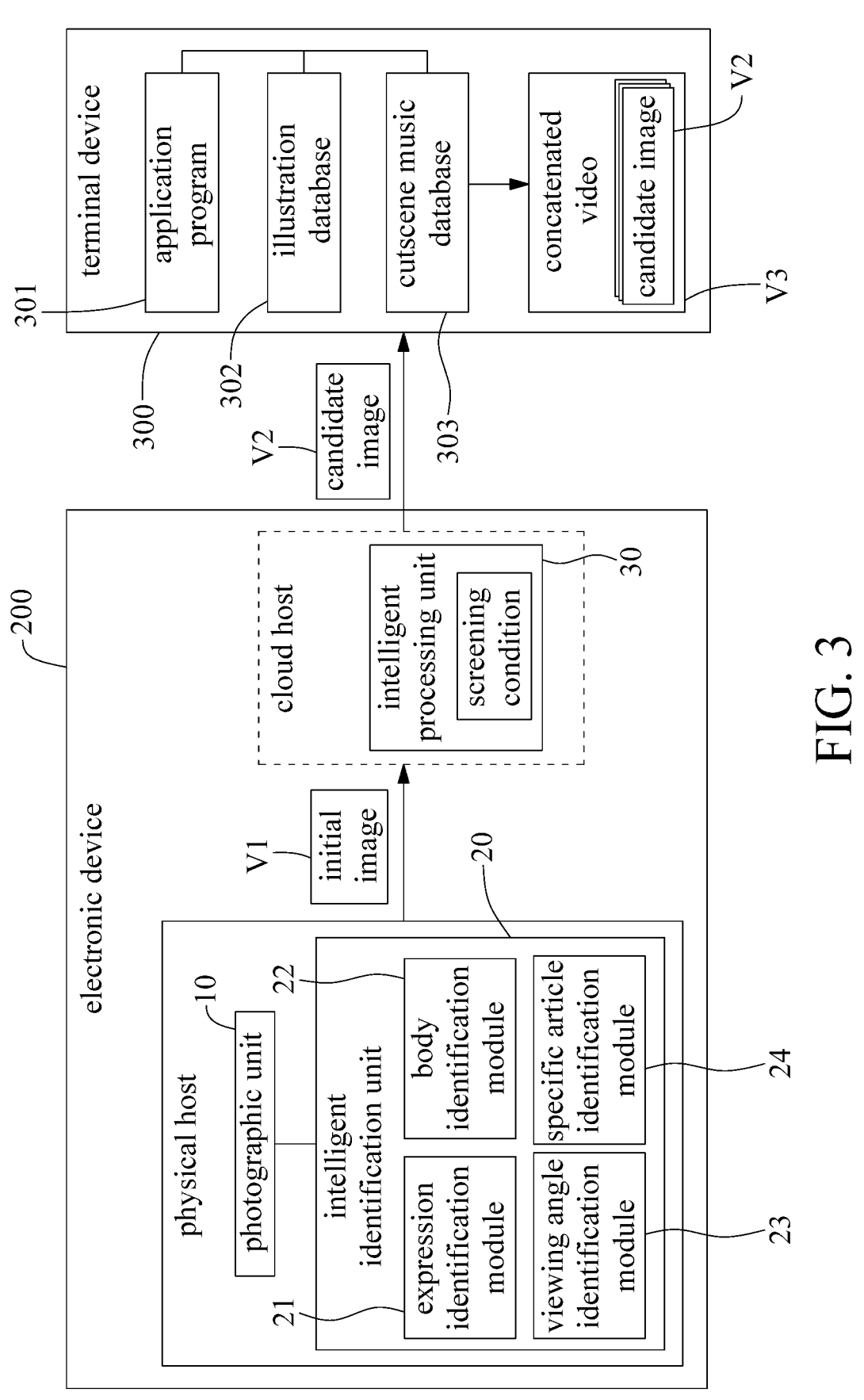
FIG. 3 is a block diagram of an electronic device of an embodiment of the present disclosure.
Figure 4:
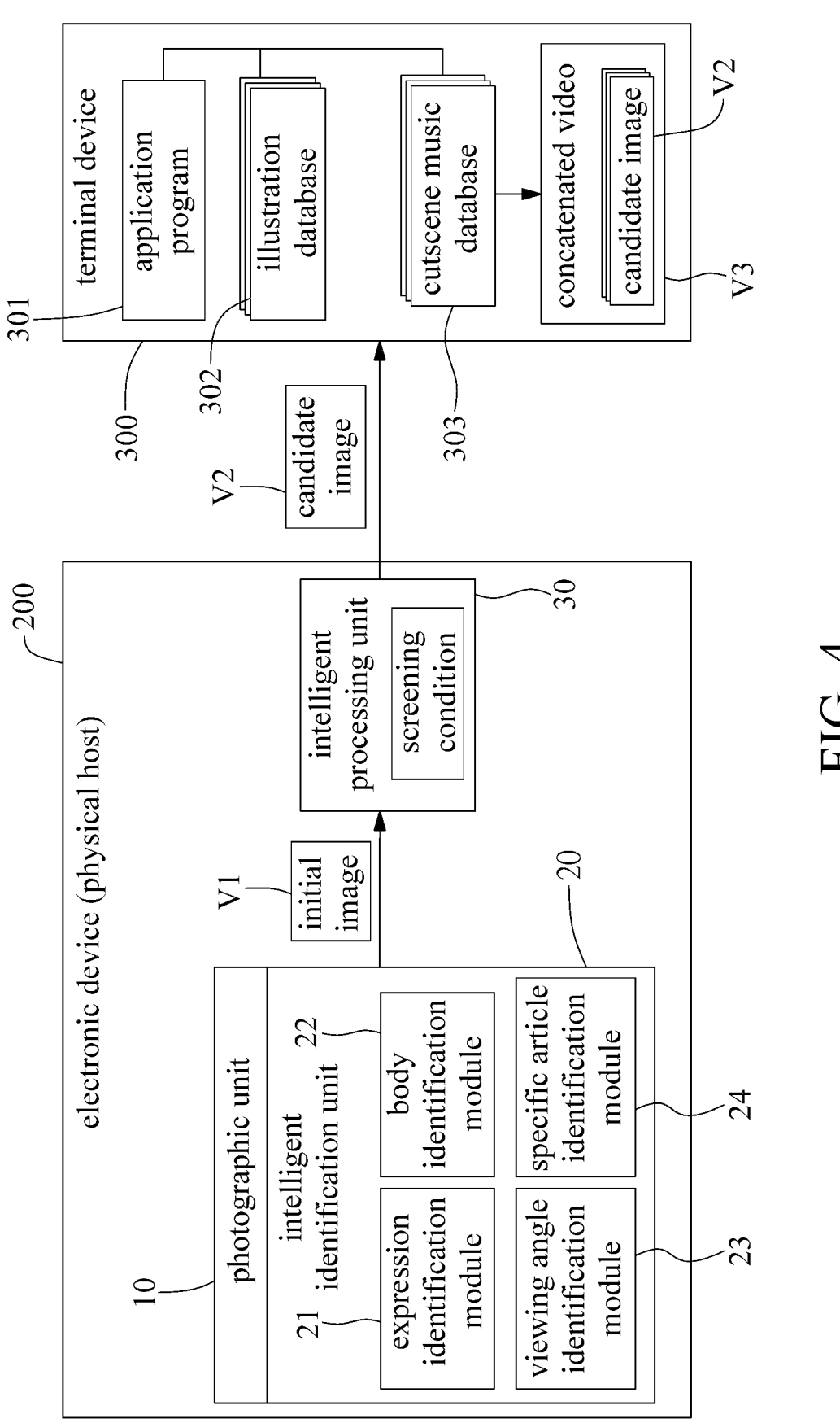
FIG. 4 is a block diagram of the electronic device of another embodiment of the present disclosure.

As to the electronic device 200 executing the processing method 100, in one embodiment, as shown in FIGS. 3-4, the electronic device 200 includes a photographic unit 10, an intelligent identification unit 20 and an intelligent processing unit 30. Among them, the intelligent identification unit 20 is electrically connected to the photographic unit 10 to receive the initial image V1, and when the initial image V1 is identified by artificial intelligence to have a plurality of preset objects, the bodies and facial expressions of the plurality of preset objects in the initial image V1 are detected. Further, the intelligent processing unit 30 is electrically connected to the intelligent identification unit 20, the intelligent processing unit 30 reads an executable code and executes multimedia image processing to the plurality of preset objects, in order to execute the above-described step of selecting images 102, and produces the concatenated video V3, the concatenated video V3 may be pushed to the terminal device 300. The initial image V1 may be a static photo or a picture captured from a dynamic video.

In one embodiment, the electronic device 200 may be a combination of a physical host and a cloud host, as shown in FIG. 3, the part of the physical host includes a combination of the photographic unit 10 and the intelligent identification unit 20, and the intelligent processing unit 30 belongs to the part of the cloud host. After initialization, the photographic unit 10 may be remotely in communication with the intelligent processing unit 30 via the Internet, and a user logs in after completing the identity authentication procedure (e.g., login account and password), in order to transmit the initial image from the physical host to the cloud host via the Internet, so that the intelligent processing unit 30 can access and process it. Further, as shown in FIG. 4, the electronic device 200 may be purely a physical host, i.e., includes a photographic unit 10, an intelligent identification unit 20, and an intelligent processing unit 30. Certainly, the present disclosure is not limited to the above combination, where the electronic device that can perform the method of the present disclosure, including a photographic unit 10, an intelligent identification unit 20, and an intelligent processing unit 30, may be configured in a combination of a physical host and a cloud host, a pure physical host or cloud host (not shown in the figure), all of which meet the protection scope of the present disclosure.

The artificial intelligence identification, for example, is performed by an artificial neural network (ANN). The intelligent identification unit 20 shown in FIGS. 3 and 4, in one embodiment, includes an expression identification module 21, used to identify the expressions of one or more preset objects; a body identification module 22, used to identify the bodies and movements of one or more preset objects; a viewing angle identification module 23, used to identify the sight direction of one or more preset objects; and/or a specific article identification module 24, used to identify a specific article appearing in the initial image V1, thereby assisting the accuracy and efficiency of the artificial intelligence identification.

As shown in FIGS. 3 and 4, the electronic device 200 is in communication with the terminal device 300, the terminal device 300 includes a cutscene music database 303, used to provide cutscene music when producing a concatenated video V3; and an illustration database 302, used to provide illustrations when producing the concatenated video V3, in order to enhance the richness of the concatenated video V3.

When the processing method 100 is executed, the step of identifying objects 101 uses artificial intelligence to identify whether there is the preset object from the initial image V1 taken by the photographic unit 10, and after the intelligent identification unit 20 detects the body position and facial expression of the preset object, the step of selecting images 102 is executed. In one embodiment, when the photographic unit 10 is activated, the step of identifying objects 101 will be cycled at a preset time (e.g., 30 seconds), if the photographic unit 10 identifies the preset object within the preset time, the step of selecting images 102 in the initial image V1 is executed; conversely, if no object is identified within the preset time, it ends (as shown in FIG. 2), and the step of identifying objects 101 is repeatedly executed.

Figure 5:
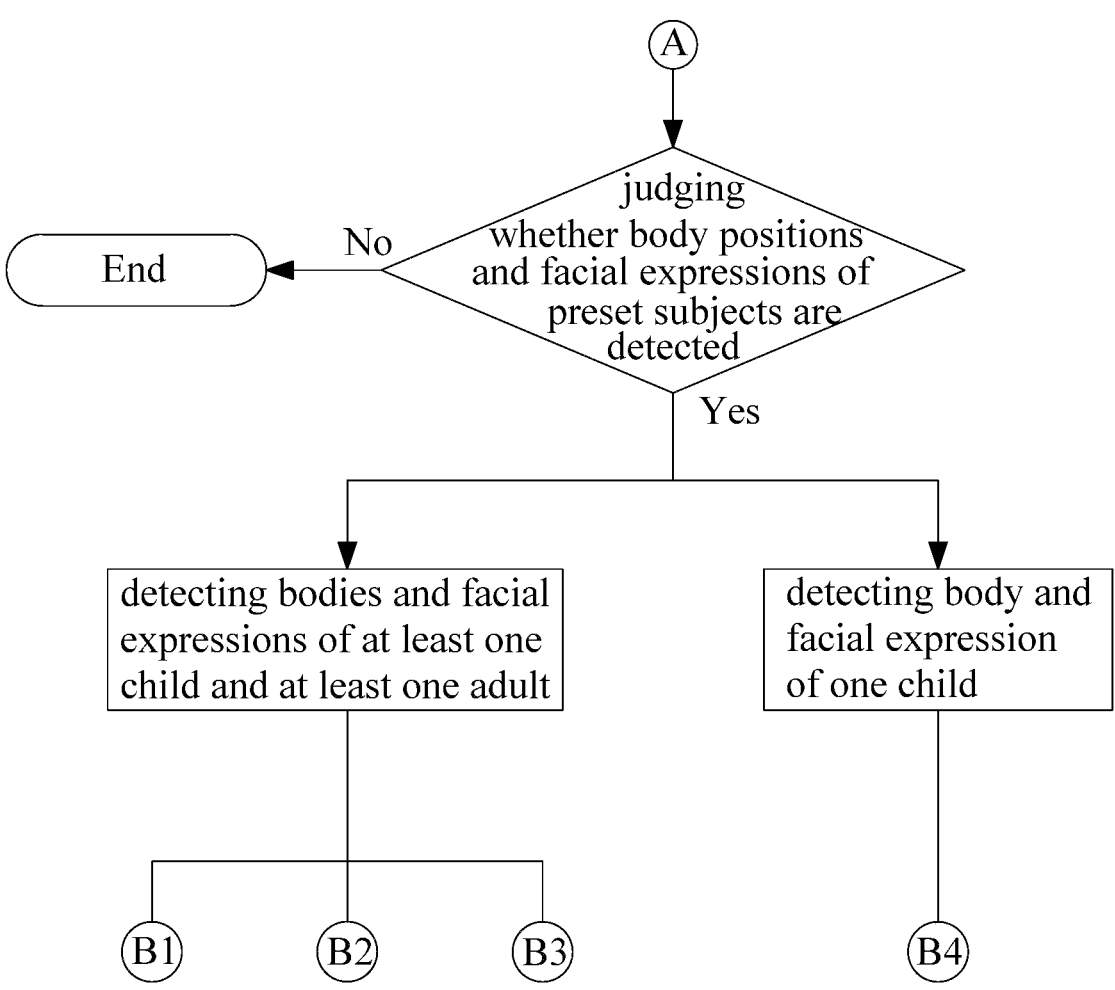
FIG. 5 is a block diagram illustrating a process of detecting preset objects of an embodiment of the present disclosure.

In the step of identifying objects 101, the preset objects that the bodies and facial expressions are detected, as shown in the processes of FIG. 5, may be detected with at least one child and at least one adult, in this situation, the execution continues according to processes B1, B2 and B3 shown in FIG. 5; alternatively, the preset object that the body and facial expression are detected may be one specific child, in this situation, the execution continues according to process B4 shown in FIG. 5. The execution of the above processes B1-B4 will be explained one by one.

In the step of selecting images 102, the selection conditions to be judged are set to include detecting the bodies and facial expressions of the plurality of preset objects in the initial image V1, and when the selection conditions conform to the plurality of preset objects for body movements and facial expressions that are emotional, and/or the plurality of preset objects have at least one of looking in similar directions, one looking at the other, and at least two looking at each other, an interception time point in the initial image V1 is selected.

Figure 14:
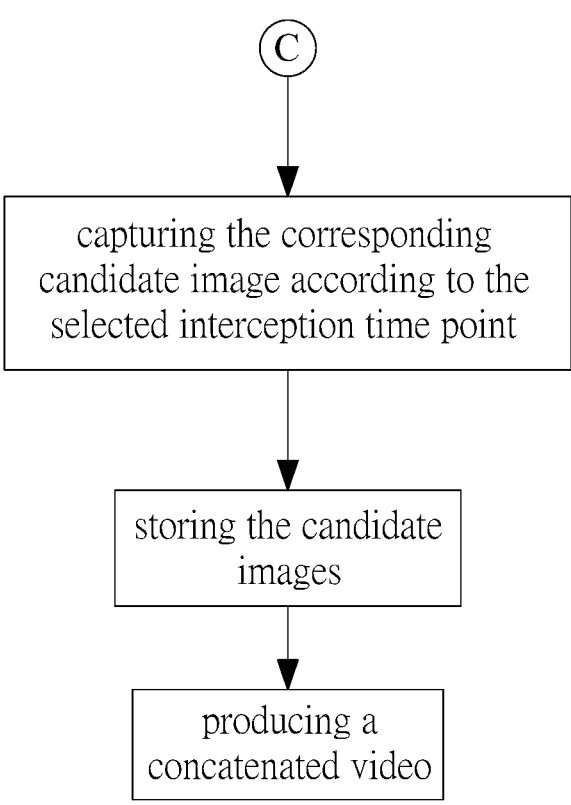
FIG. 14 is a block diagram illustrating a concatenated video produced by candidate images of the embodiment of the present disclosure.

In the step of concatenating videos 103, as shown in process C marked in FIG. 14, a candidate image V2 is selected according to the interception time point in the initial image V1, and more than one candidate image V2 is collected to produce a concatenated video V3.

The facial expression is emotional, including positive emotions or negative emotions, rather than expressionless, the emotional behavior described herein can be judged by artificial intelligence to identify the performance of facial expression muscles, eye shape and mouth shape. Among them, the positive emotions that are relatively obvious, such as the facial expression of the preset object with a smile on the face as the detection focus, can be slight smile, smile, chuckle, laughter and other different degrees of smile, and show delight, happiness, excitement, pleasant amazement and other positive emotions; in addition, the negative emotions that are relatively obvious, such as the facial expression of the preset object with crying on the face as the detection focus, show sadness, surprise, anger. Further, the looking in similar directions may be looking in exactly the same direction, or looking in approximately the same direction, and showing a state of attention to the same thing.

Further description of the detailed process of the above multimedia image processing method 100 and examples are provided as follows:

When process B1 is executed, the selection condition includes calculating that the facial expressions of children in the initial image are positive emotions or negative emotions, and the facial expressions of adults in the initial image are positive emotions.

Figure 6B:
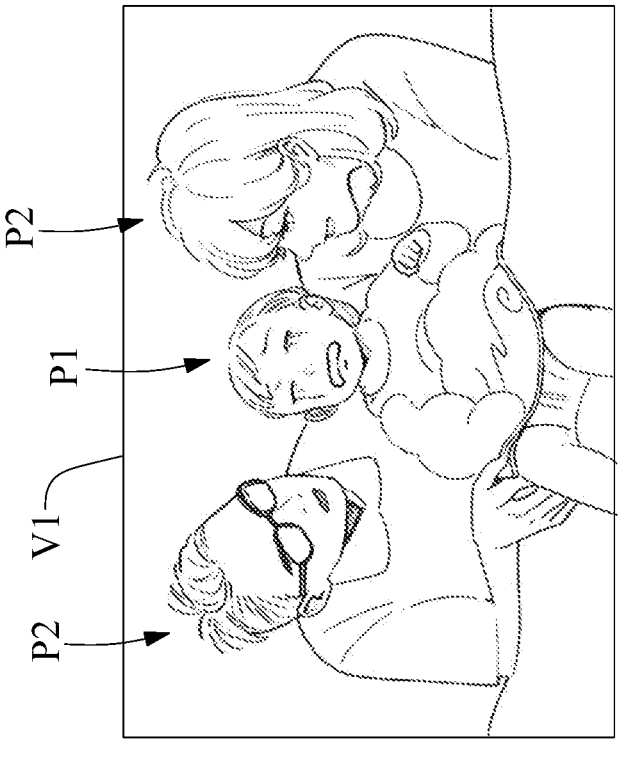
FIG. 6B is a schematic view of another scene corresponding to the process B1 of the embodiment of the present disclosure.
Figure 6A:
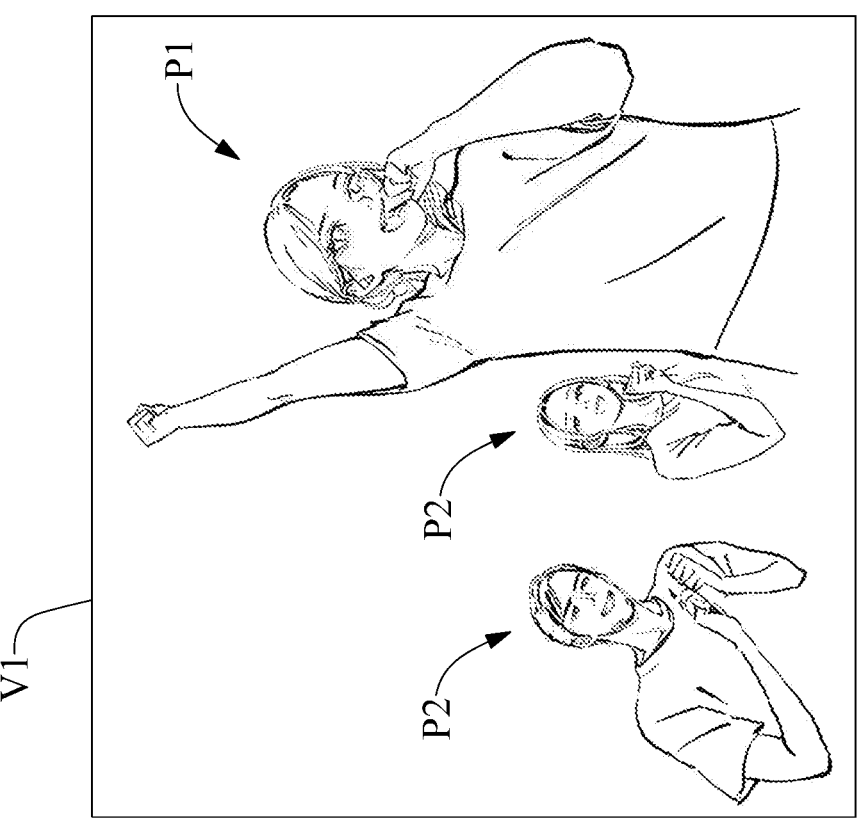
FIG. 6A is a schematic view of a scene corresponding to the process B1 of the embodiment of the present disclosure.

Continuously, the initial image V1 as shown in FIG. 6A, it includes a child P1 standing in the front position, and two adults P2 sitting in the back position. The child P1 in FIG. 6A can be detected with body stretching and waving, and the two adults P2 in the back position can be detected with body movements like clapping, which can determine the body movements of the child P1 and adults P2; as shown in FIG.

Figure 7:
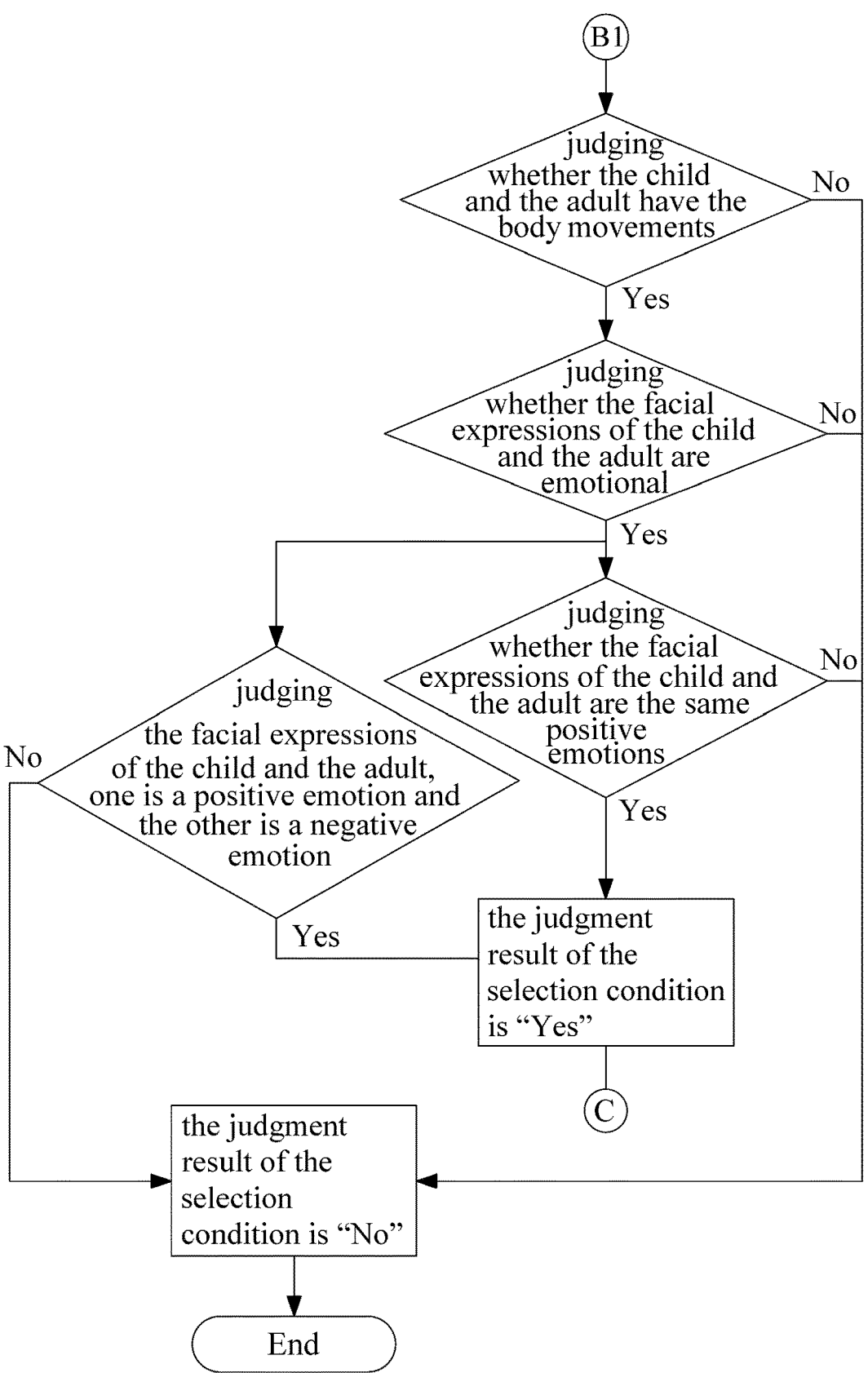
FIG. 7 is a block diagram illustrating the process B1 of the embodiment of the present disclosure.

6A, the faces of two adults P2 can be detected with happy positive emotions, and the child P1 can also be detected with a positive emotion with smile, it can be judged that the facial expressions of the child P1 and adults P2 are emotional, and the same positive emotions, referring to process B1 of FIG. 7 together, at this time, the judgment result of the selection condition is "Yes" and the interception time point is selected, and then the step of concatenating videos 103 (as marked in FIG. 7, continuing the step of concatenating videos 103 shown in FIG. 14, FIGS. 9, 11 and 13 are the same) is performed. In the initial image V1 as shown in FIG. 6A, it can be seen that the child P1 and two adults P2 show a situation of singing and playing together.

As shown in FIG. 6B, the initial image V1 includes a child P1 in the middle and two adults P2 holding the child P1 at both sides. In this initial image V1, it can be detected that the child P1 is crying, and the body movements of two adults P2 holding the child P1 can be detected, and the body movements of the child P1 and the adults P2 can be determined; furthermore, the facial expression of child P1 is detected as crying, and the facial expressions of the adults P2 at both sides are respectively detected with a smile or a chuckle, it can be judged that the facial expressions of the child P1 and the adults P2 are emotional, where the facial expression of the child P1 is a negative emotion, and the facial expressions of the two adults P2 are positive emotions, referring to process B1 of FIG. 7 together, at this time, the judgment result of the selection condition is "Yes" and the interception time point is selected, and then the step of concatenating videos 103 is performed. In the initial image V1, it can be seen that the child P1 and the two adults P2 present a contrasting funny situation with opposite facial emotions.

FIGS. 6A and 6B take the facial expressions of the child P1 and the adults P2 that are the same positive emotions and the opposite facial emotions for example, however, when the facial expressions of the child P1 and the adults P2 are emotional, but the facial expressions of the child P1 and the adults P2 are negative emotions, or at least one is expressionless, referring to process B1 of FIG. 7 together, the judgment result of the selection condition is "No", at this time the process B1 ends and returns to the step of identifying objects 101. If the following embodiments have similar scenarios, the results are the same and will not be repeated.

When process B2 is executed, the selection condition includes that the plurality of preset objects are looking in similar directions, one is looking at the other and at least two are looking at each other, and the selection condition is met if at least one of the situations is satisfied. In one embodiment, the selection condition includes detecting that there is a selected article in the initial image V1, and at least one of the plurality of preset objects is looking at the selected article, and/or at least one is holding the selected article. The selected article S, for example, is a plaything or teaching aid, the plaything may be a doll, a toy or other thing with a function for play; the teaching aid may itself be in the shape of symbols (e.g., puzzle pieces), or an article attached with symbols (e.g., paper with symbols).

Figures 8A, 8B, 8C, 8D:
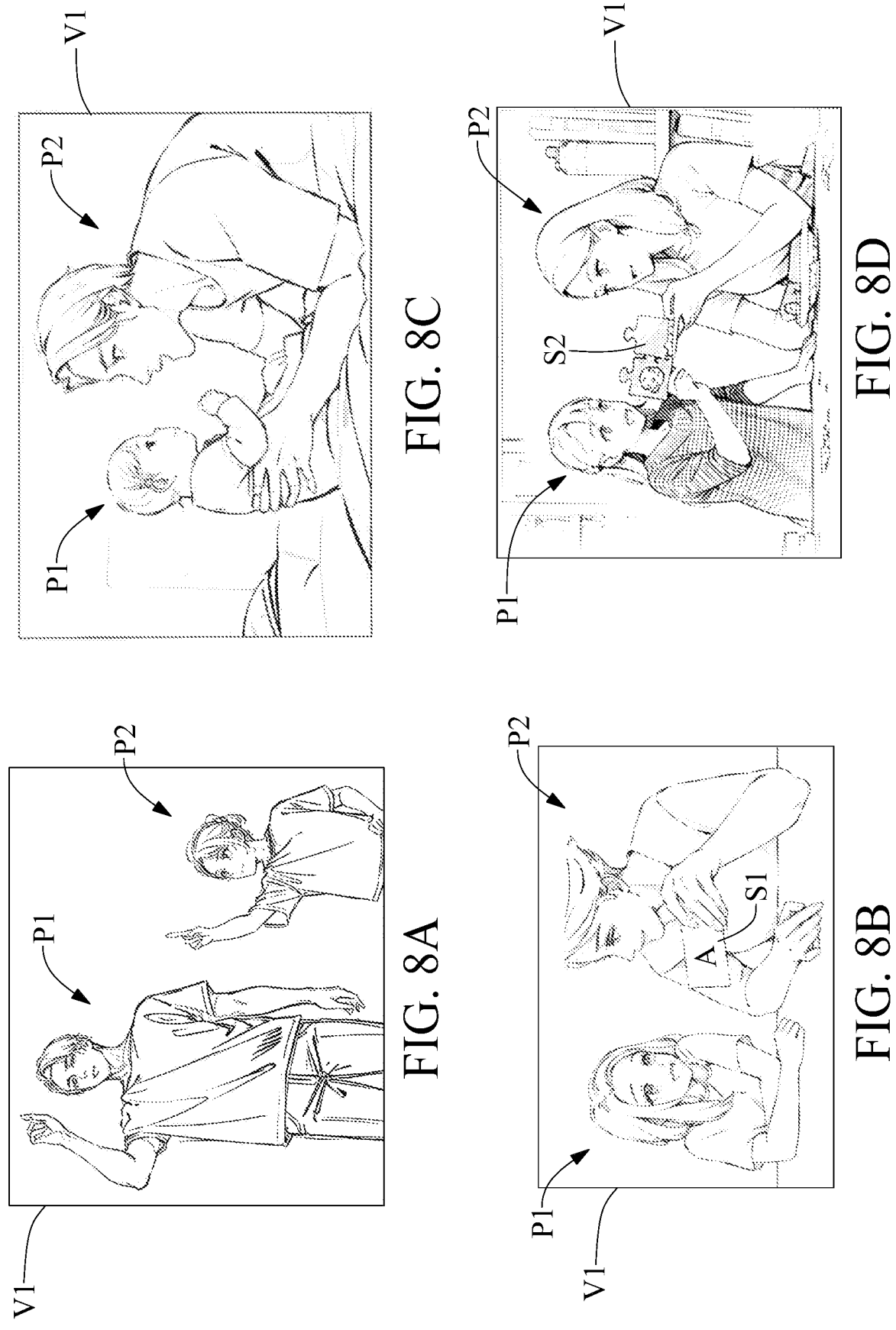
FIG. 8A is a schematic view of a scene corresponding to the process B2 of the embodiment of the present disclosure.
FIG. 8B is a schematic view of another scene corresponding to the process B2 of the embodiment of the present disclosure.
FIG. 8C is a schematic view of further another scene corresponding to the process B2 of the embodiment of the present disclosure.
FIG. 8D is a schematic view of still another scene corresponding to the process B2 of the embodiment of the present disclosure.
Figure 9:
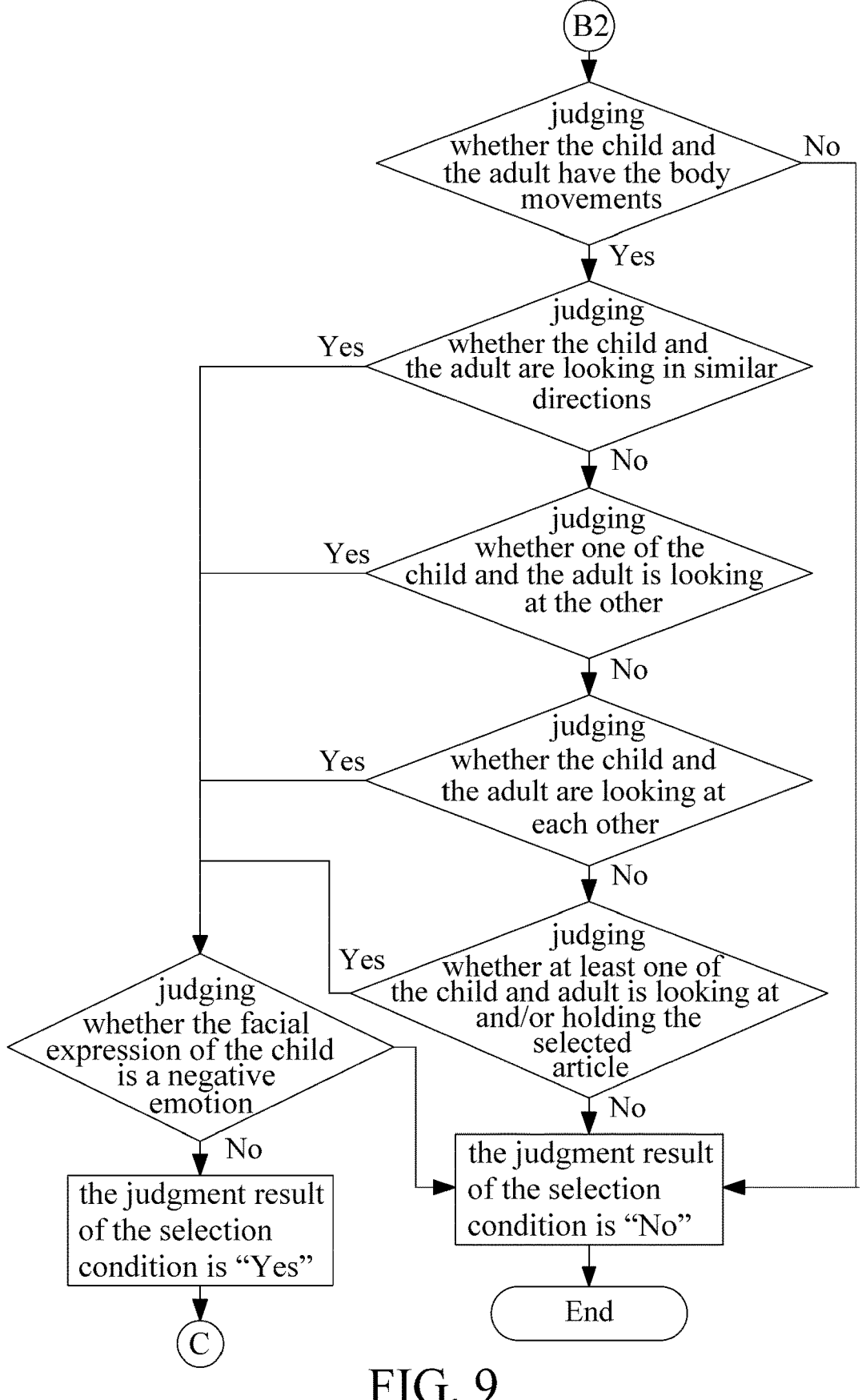
FIG. 9 is a block diagram illustrating the process B2 of the embodiment of the present disclosure.
Figure 11:
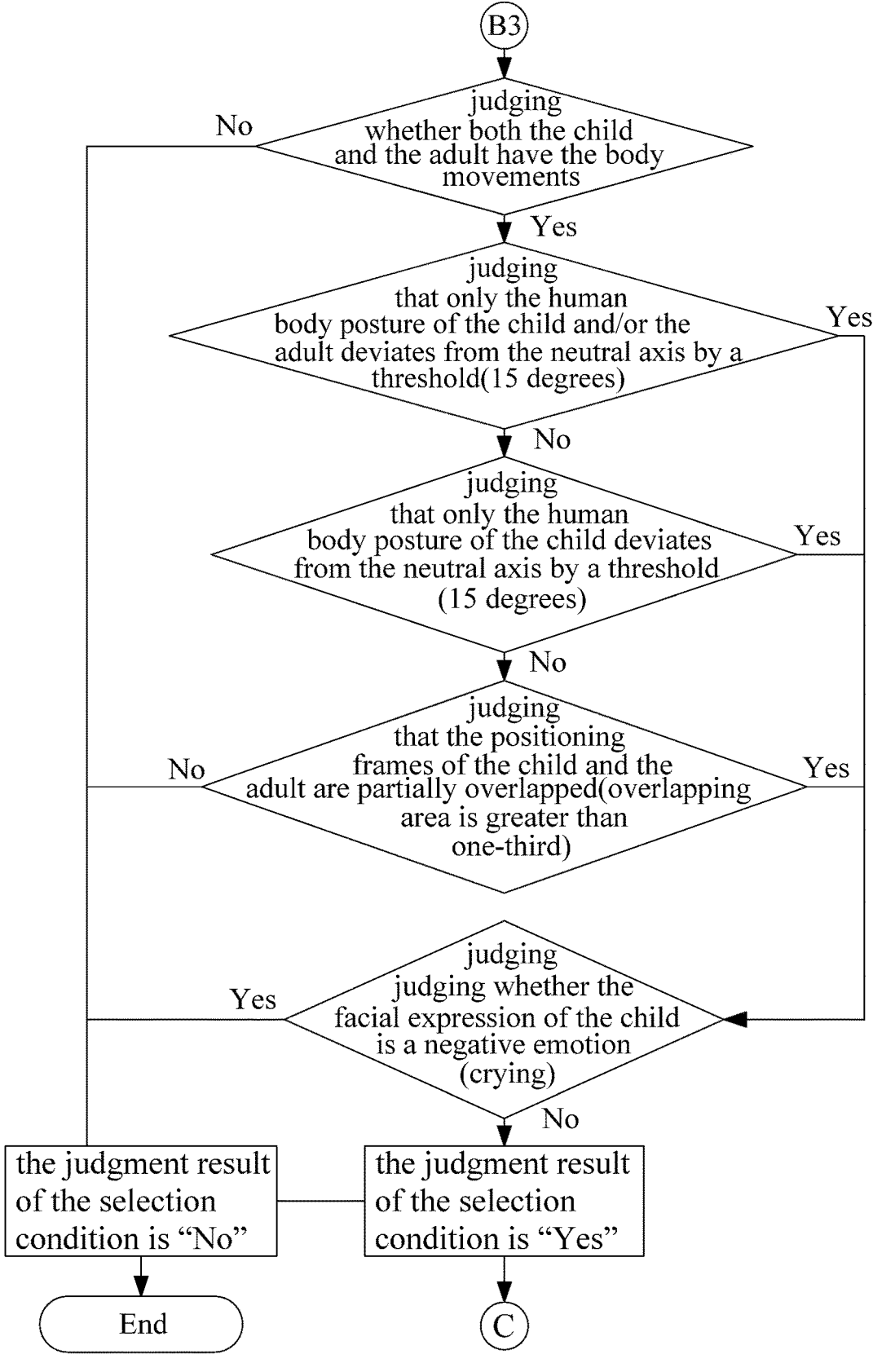
FIG. 11 is a block diagram illustrating the process B3 of the embodiment of the present disclosure.

Continuously, the initial image V1 as shown in FIG. 8A, a child P1 and an adult P2 are included in the initial image V1. The child P1 and the adult P2 are both looking in similar directions together, and the hands are also pointing in the direction they are looking at, both the child P1 and the adult P2 are detected with smiles and happy positive emotions rather than negative expressions, referring to the process of FIG. 9, the judgment result of the selection condition is "Yes" and the interception time point is selected, and then the step of concatenating videos 103 is performed. In the initial image V1, it can be seen that the child P1 and the adult P2 present a situation of interacting happily.

Further, as shown in FIG. 8B, a child P1 and an adult P2 are included in the initial image V1. The adult P2 holds a note S1 written with a symbol (e.g., number or English letter), the adult P2 looks at the child P1, and the child P1 is detected with a positive emotion with a smile rather than a negative expression, referring to the process of FIG. 9, the judgment result of the selection condition is "Yes" and the interception time point is selected. In the initial image V1, it can be seen that the child P1 and the adult P2 present a pleasant teaching situation.

Also, as shown in FIG. 8C, a child P1 and an adult P2 are included in the initial image V1. The adult P2 holds the child P1 in his hands, the child P1 and the adult P2 look at each other, the child P1 is detected to have a positive emotion of pleasant amazement rather than a negative expression, referring to the process of FIG. 9, the judgment result of the selection condition is "Yes" and the interception time point is selected. In the initial image V1, it can be seen that the child P1 and the adult P2 in the initial image V1 present a situation of interacting happily.

Further, as shown in FIG. 8D, a child P1 and an adult P2 are included in the initial image V1. The child P1 and the adult P2 are respectively holding a puzzle piece S2 and placed in the center of the initial image V1, the child P1 and the adult P2 are detected with smiles and positive emotions rather than negative expressions, and the child P1 and the adult P2 are also looking at the puzzle pieces S2, referring to the process of FIG. 9, the judgment result of the selection condition is "Yes" and the interception time point is selected. In the initial image V1, it can be seen that the child P1 and the adult P2 in the initial image V1 present a situation of playing the puzzle happily.

When process B3 is executed, the plurality of preset objects respectively define a positioning frame in the initial image, each of which is an area occupied by the corresponding preset object in the initial image, the selection condition includes detecting that when an area overlapping the plurality of positioning frames in the initial image is greater than a threshold, for example, an area ratio of the overlapping area to each positioning frame is greater than one-third, and it is selected as an interception time point in the initial image. Alternatively, a neutral axis is defined in the initial image, and the plurality of preset objects respectively define a human body posture, the selection condition includes determining that when the human body posture of each preset object in the initial image deviates from the neutral axis by a threshold, it is selected as an interception time point in the initial image, the threshold is set according to an angle between a human body midline defined by the preset object in the initial image and the neutral axis, such as 15 degrees.

As shown in FIG. 10A, a child P1 and an adult P2 are included in the initial image V1, and the adult P2 is defined with a positioning frame F1, and the child P1 is defined with a positioning frame F2. In the initial image V1, the adult P2 bends over and has a body movement with the arm stretched outward, and the child P1 is superimposed on the back of the adult P2 and has limbs stretched outward, and an area overlapping the positioning frame F1 of the adult P2 and the positioning frame F2 of the child P1 in the initial image V1 is greater than one-third of the positioning frame F1 (the set threshold) and greater than one-third of the positioning frame F2, and both the child P1 and the adult P2 are detected with positive emotions with smiles rather than negative expressions, referring to the process of FIG. 11, the judgment result of the selection condition is "Yes" and the interception time point is selected, and then the step of concatenating videos 103 is performed. In the initial image V1, it can be seen that the child P1 and the adult P2 in the initial image V1 present a situation of interacting happily.

Further, as shown in FIG. 10B, a child P1 and an adult P2 are included in the initial image V1, and a neutral axis NA is defined in the initial image V1, and the child P1 and the adult P2 respectively define a human body midline C1 and a human body midline C2, and the threshold is set to 15 degrees. The child P1 and the adult P2 are holding hands, and the human body postures are respectively in an oblique standing posture, and the human body midline C1 of the child P1 and the human body midline C2 of the adult P2 are respectively formed by angles $\theta1$ and $\theta2$ with the neutral axis NA, and the angles $\theta1$ and $\theta2$ are greater than the threshold of 15 degrees, wherein the child P1 and the adult P2 are detected with positive emotions with smiles rather than negative expressions, referring to the process of FIG. 11, the judgment result of the selection condition is "Yes" and the interception time point is selected, and then the step of concatenating videos 103 is performed. In the initial image V1, it can be seen that centers of gravity of the child P1 and the adult P2 are respectively biased towards two sides of the neutral axis NA to be symmetrical, showing a lively and delightful situation different from upright posture interaction.

Continuously, both the human body postures of the child P1 and the adult P2 shown in FIG. 10B relative the neutral axis NA deviate from the set threshold, but the present disclosure is not limited thereto, or only one of the human body postures relative neutral axis NA deviates from the set threshold, such as FIG. 10C, in the child P1 and the adult P2, only the human body midline C1 of the child P1 relative neutral axis NA deviates from the set threshold.

When process B4 is executed, similar to process B3, the preset object in the initial image is judged by the selection condition to be one specific child, and process B4 also judges that the human body posture of the child relative to the neutral axis deviates from the threshold. In addition, in process B4, the selection condition includes detecting the body position of the preset object in the initial image, and determining that when the angle of arms opening of the preset object is greater than a threshold (taking 90 degrees as an example), it is selected as an interception time point in the initial image; the selection condition also includes detecting the body position of the preset object in the initial image, and determining that the body position of the preset object has body stretching, body connection, body constituting geometry, and/or body symmetry.

Figure 12B:
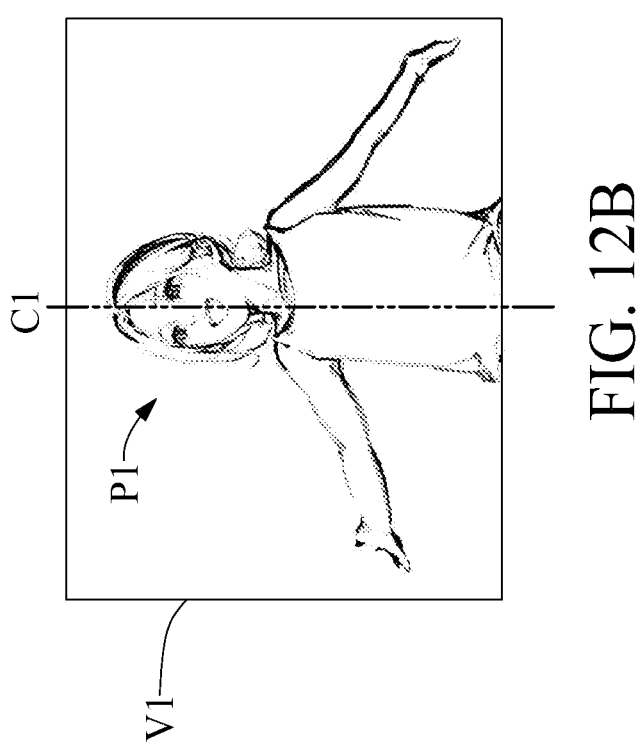
FIG. 12B is a schematic view of another scene corresponding to the process B4 of the embodiment of the present disclosure.
Figure 12A:
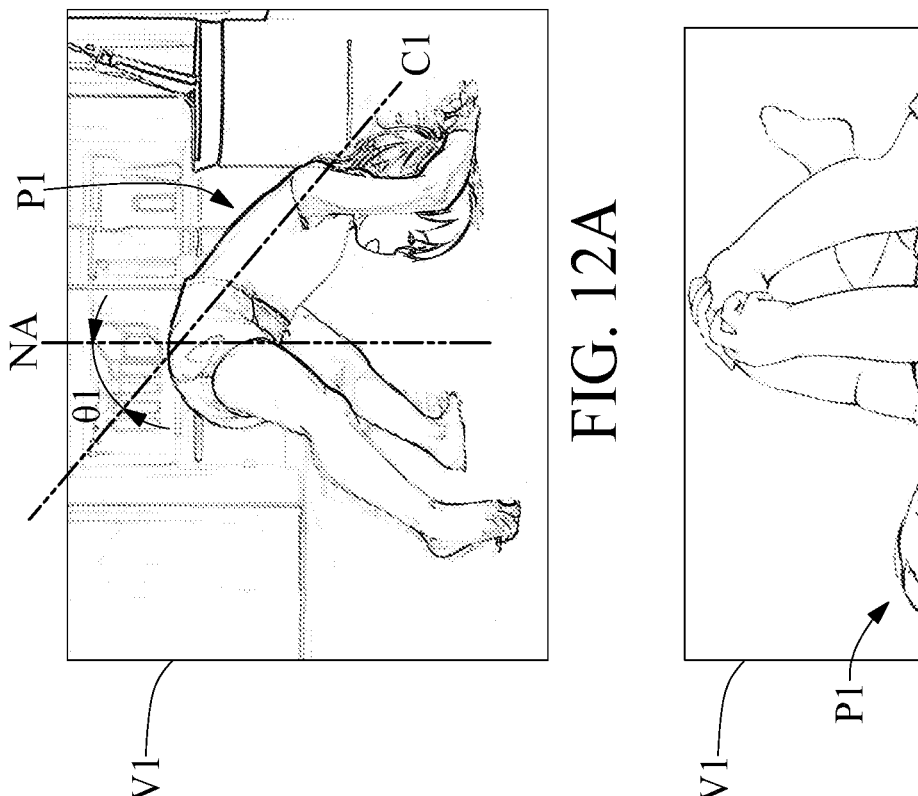
FIG. 12A is a schematic view of a scene corresponding to the process B4 of the embodiment of the present disclosure.

As shown in FIG. 12A, there is only one child P1 in the initial image V1, and a neutral axis NA is defined in the initial image V1, and the child P1 defines a human body midline C1 with the body torso, and the threshold is also set to 15 degrees. The child P1 touches the ground by hands, feet and head, the body is arched, and the angle $\theta1$ formed by the deviation of the human body midline C1 relative to the neutral axis NA is greater than 15 degrees, wherein the child P1 is detected with a positive emotion with a smile rather than a negative expression, referring to the process of FIG. 13, the judgment result of the selection condition is "Yes" and the interception time point is selected, and then the step of concatenating videos 103 is performed. In the initial image V1, it can be seen that a center of gravity of the child P1 in the initial image V1 is also biased towards the neutral axis NA, showing a lively and delightful situation different from upright posture interaction.

As shown in FIG. 12B, a child P1 is included in the initial image V1. In the initial image V1, the arms of the child P1 are open, and the angle of the arms opening is greater than 90 degrees, wherein the child P1 is detected with a positive emotion with a smile rather than a negative expression, referring to the process of FIG. 13, the judgment result of the selection condition is "Yes" and the interception time point is selected, and then the step of concatenating videos 103 is performed. In the initial image V1, it can be seen that the child P1 in the initial image V1 presents a happy situation with both arms stretching.

Figure 12C:
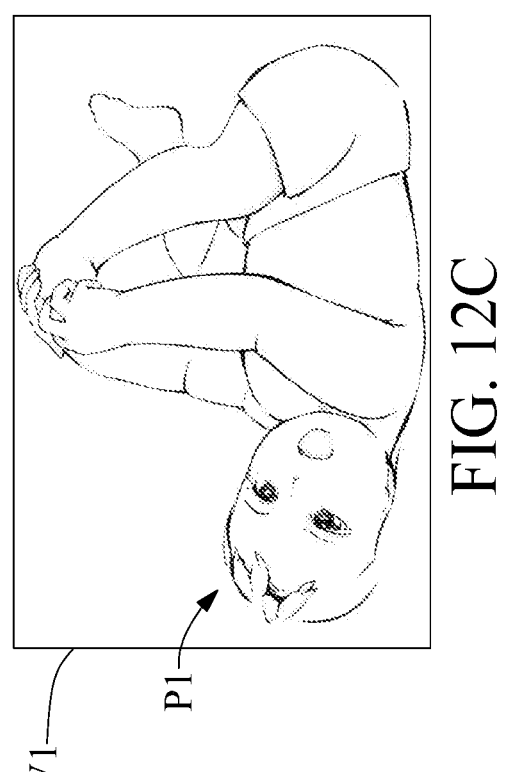
FIG. 12C is a schematic view of further another scene corresponding to the process B4 of the embodiment of the present disclosure.
Figure 13:
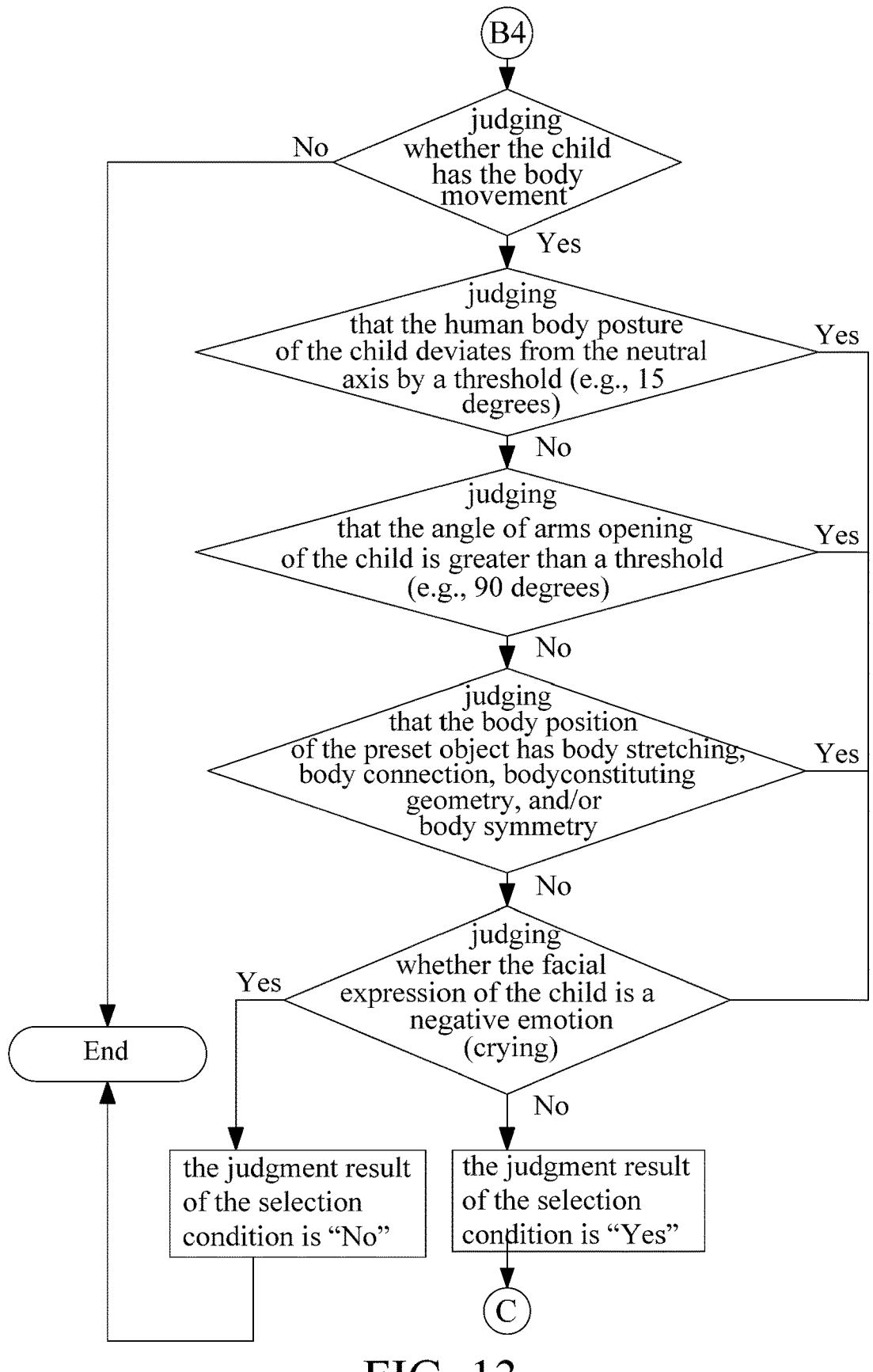
FIG. 13 is a block diagram illustrating the process B4 of the embodiment of the present disclosure.

As shown in FIG. 12C, a child P1 is included in the initial image V1. In the initial image V1, the child P1 is lying with both hands grasping his right foot, the posture is hand and foot connected, and the child P1 is detected with a positive emotion with a smile rather than a negative expression, referring to the process of FIG. 13, the judgment result of the selection condition is "Yes" and the interception time point is selected, and then the step of concatenating videos 103 is performed. In the initial image V1, it can be seen that the child P1 in the initial image V1 presents a playing situation with hands and feet connected. Additionally, in addition to the situation where the hands and feet are connected as described above, the child P1 in the initial image V1 has the situation, such as body stretching (referring to the child P1 has a posture with hands and feet opening in FIG. 10A), body constituting geometry (the child P1 has a like triangular posture in FIG. 12A), and/or body symmetry (the child P1 has a posture with arms opening and symmetrical left and right in FIG. 12B), and the child P1 is detected with a positive emotion of a smile rather than a negative expression. The judgment result of the selection condition will be the same as "Yes" and the interception time point is selected.

Figure 15:
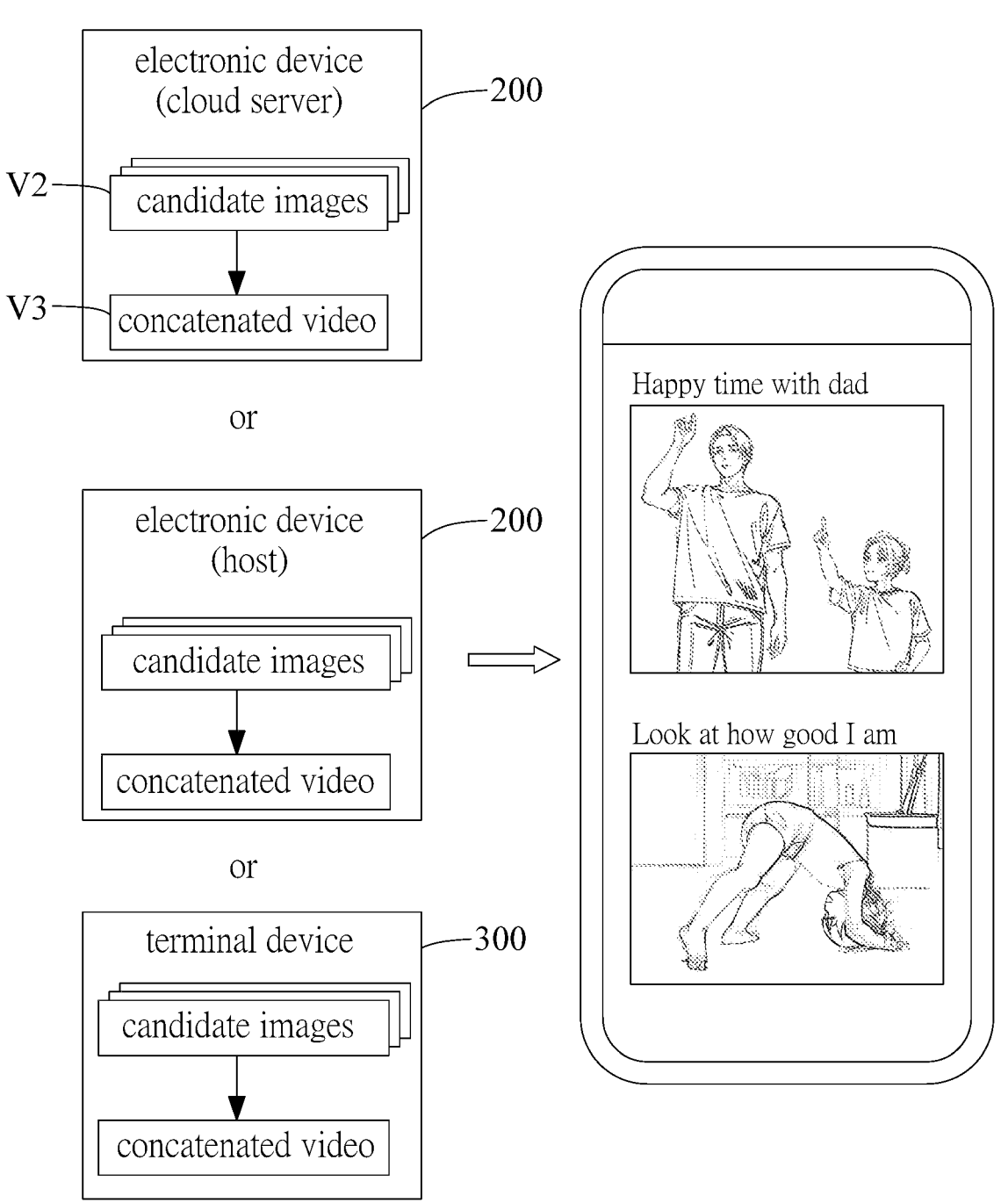
FIG. 15 is a schematic block diagram of the concatenated video pushing and displaying of the embodiment of the present disclosure.

The terminal device 300 may be a portable mobile communication device, such as a smart phone shown in FIG. 15, or a tablet, laptop can be connected to the electronic device 200 via the Internet. The terminal device 300 is equipped with an application program 301 (referring to FIGS. 3 and 4 together), the application program 301 is executed through the terminal device 300, and a user logs in after performing the identity authentication procedure (e.g., login account and password), in order to receive a push of the concatenated video V3 from the electronic device 200, the user can view the concatenated video V3 through the terminal device 300 (referring to FIG. 15 together).

From the above description, it is not difficult to find that the features of the present disclosure are:

Firstly, when the preset object in the initial image V1 is detected as plurality, for example, the initial image V1 of the above embodiment includes one child P1 and one or more adult P2, according to the set selection conditions, the preset objects in the initial image V1 are detected to have body movements and facial expressions that are emotional (including positive emotions or negative emotions), and the plurality of preset objects have at least one situation such as looking in similar directions, one looking at the other, and/or at least two looking at each other, thereby selecting a candidate image V2 that the body movements of the preset objects have interaction and/or the facial expressions are associated, and then the candidate image V2 can be collected to produce a concatenated video V3 with rich contents, compared with the prior art that only uses artificial intelligence to judge the preferable composition conditions and select it, the content of the concatenated video V3 is more narrative and thematic, and can further meet the user's expectations for rich image content.

Secondly, if when the preset object in the initial image V1 is detected as one, for example, there is only one child P1 in the initial image V1 of the above embodiment, through the setting of preset postures, when the body position of the preset object in the initial image V1 is detected to conform to the preset posture, a candidate image V2 that the body movements of the preset object are different from the general situation is selected, and then a vivid and interesting concatenated video V3 is produced, compared with the prior art that only uses artificial intelligence to judge the preferable composition conditions and select it, the content of the concatenated video V3 is more narrative and thematic, and can also meet the user's expectations for rich image content.

While the present invention has been described by means of preferable embodiments, those skilled in the art should understand the above description is merely embodiments of the invention, and it should not be considered to limit the scope of the invention. It should be noted that all changes and substitutions which come within the meaning and range of equivalency of the embodiments are intended to be embraced in the scope of the invention. Therefore, the scope of the invention is defined by the claims.

What is claimed is:

1. A multimedia image processing method, executed by an electronic device reading an executable code, identifying a plurality of preset objects by artificial intelligence, and performing multimedia image processing to the plurality of preset objects, comprising the following steps:

identifying objects: from an initial image, identifying whether there are the plurality of preset objects by artificial intelligence, and detecting bodies and facial expressions of the plurality of preset objects in the initial image; and selecting images: setting a selection condition, the selection condition comprises the plurality of preset objects having body movements and facial expressions that are emotional, and the plurality of preset objects have at least one of looking in similar directions, one looking at the other, and at least two looking at each other, an interception time point is selected in the initial image when conforming to the selection condition, and a candidate image is selected according to the interception time point in the initial image, the candidate image is configured to be collected to produce a concatenated video.

2. The multimedia image processing method according to claim 1, wherein at least one of the preset objects is a child, and at least one is an adult; the selection condition further comprises calculating that the facial expression of the child in the initial image is a positive emotion or negative emotion, and the facial expression of the adult in the initial image is a positive emotion.

3. The multimedia image processing method according to claim 2, wherein the selection condition further comprises calculating that the movements of the child and the adult in the initial image are the same or opposite, and/or the expressions are the same or opposite.

4. The multimedia image processing method according to claim 1, wherein the selection condition comprises detecting that there is a selected article in the initial image, and when at least one of the plurality of preset objects is looking at the selected article, and/or at least one is holding the selected article the interception time point is selected in the initial image.

5. The multimedia image processing method according to claim 1, wherein the plurality of preset objects respectively define a positioning frame in the initial image, each of which is an area occupied by the corresponding preset object in the initial image, the selection condition comprises detecting that when an area overlapping a plurality of positioning frames in the initial image is greater than a threshold, the interception time point is selected in the initial image.

6. The multimedia image processing method according to claim 1, wherein a neutral axis is defined in the initial image, and the plurality of preset objects respectively define a human body posture, the selection condition comprises determining that when the human body posture of each preset object in the initial image deviates from the neutral axis by a threshold the interception time point is selected in the initial image.

7. The multimedia image processing method according to claim 1, wherein the plurality of preset objects respectively define a body position, the selection condition comprises determining the body position of each preset object in the initial image, and determining that when the angle of arms opening of each preset object is greater than a threshold the interception time point is selected in the initial image.

8. A terminal device in communication with the electronic device executing the method according to claim 1, the terminal device is equipped with an application program, the terminal device executes the application program to collect more than one candidate image to produce the concatenated video.

9. A multimedia image processing method, executed by an electronic device reading an executable code, identifying a preset object by artificial intelligence, and performing multimedia image processing to the preset object, comprising the following steps:

identifying objects: from an initial image, identifying whether there is the preset object by artificial intelligence, detecting a body position of the preset object in the initial image; and selecting images: setting a selection condition, the selection condition comprises the body position of the preset object conforming to a preset posture, an interception time point is selected in the initial image when conforming to the selection condition, and a candidate image is selected according to the interception time point in the initial image, the candidate image is configured to be collected to produce a concatenated video, wherein a neutral axis is defined in the initial image, and the preset object defines a human body posture, the selection condition comprises detecting that when the human body posture of the preset object in the initial image deviates from the neutral axis by a threshold, the interception time point is selected in the initial image.

10. The multimedia image processing method according to claim 9, wherein the selection condition comprises detecting the body position of the preset object in the initial image, and determining that when the angle of arms opening of the preset object is greater than a threshold the interception time point is selected in the initial image.

11. The multimedia image processing method according to claim 9, wherein the preset object defines a human body midline in the initial image, the selection condition comprises detecting the body position of the preset object in the initial image, and determining that when the body position of the preset object has body stretching, body connection, body constituting geometry, and/or body symmetry, the interception time point is selected in the initial image.

12. A terminal device in communication with the electronic device executing the method according to claim 9, the terminal device is equipped with an application program, the terminal device executes the application program to collect more than one candidate image to produce the concatenated video.

13. An electronic device for multimedia image processing, comprising:

a photographic unit for taking an initial image;

an intelligent identification unit, electrically connected to the photographic unit to receive the initial image, identifying an initial image having a plurality of preset objects by artificial intelligence, and detecting bodies and facial expressions of the plurality of preset objects in the initial image; and an intelligent processing unit, the intelligent processing unit is electrically connected to the intelligent identification unit, and the intelligent processing unit reads an executable code and executes multimedia image processing to the plurality of preset objects, comprising setting a selection condition, the selection condition comprises the plurality of preset objects have body movements and facial expressions that are emotional, and the plurality of preset objects have at least one of looking in similar directions, one looking at the other, and at least two looking at each other, an interception time point is selected in the initial image when conforming to the selection condition, the candidate image is configured to be collected to produce a concatenated video.

14. The electronic device for multimedia image processing according to claim 13, wherein the photographic unit and the intelligent identification unit belong to a physical host, and the intelligent processing unit belongs to a cloud host.

15. The electronic device for multimedia image processing according to claim 13, wherein the preset object comprises at least one child and one adult, the intelligent identification unit further comprises an expression identification module, configured to identify the expressions of the child and the adult; a body identification module, configured to identify the body position of the child and the adult; a viewing angle identification module, configured used to identify viewing angles of the child and the adult; and/or a specific article identification module, configured to identify a specific article in the initial image.

16. A terminal device in communication with the electronic device according to claim 13, the terminal device is equipped with an application program, the terminal device executes the application program to collect more than one candidate image to produce the concatenated video.

17. An electronic device for multimedia image processing, comprising:

a photographic unit for taking an initial image;

an intelligent identification unit, electrically connected to the photographic unit to receive the initial image, identifying the initial image having a preset object by artificial intelligence, and detecting a body position of the preset object; and an intelligent processing unit, electrically connected to the intelligent identification unit, and reading an executable code and executing thereto, in order to set a selection condition, the selection condition comprises the body position of the preset object conforming to a preset posture, an interception time point is selected in the initial image when conforming to the selection condition, the intelligent processing unit selects a candidate image according to the interception time point, the candidate image is configured to be collected to produce a concatenated video, wherein a neutral axis is defined in the initial image, and the preset object defines a human body posture, the selection condition comprises detecting that when the human body posture of the preset object in the initial image deviates from the neutral axis by a threshold, the interception time point is selected in the initial image.

18. The electronic device for multimedia image processing according to claim 17, wherein the photographic unit and the intelligent identification unit belong to a physical host, and the intelligent processing unit belongs to a cloud host.

19. The electronic device for multimedia image processing according to claim 17, wherein the preset object comprises at least one child and one adult, the intelligent identification unit further comprises an expression identification module, configured to identify the expressions of the child and the adult; a body identification module, configured to identify the body position of the child and the adult; a viewing angle identification module, configured to identify viewing angles of the child and the adult; and/or a specific article identification module, configured to identify a specific article in the initial image.

20. A terminal device in communication with the electronic device according to claim 17, the terminal device is equipped with an application program, the terminal device executes the application program to collect more than one candidate image to produce the concatenated video.

* * * * *